June 19, 1934.   C. A. MORALES   1,963,333
CARRIER
Filed Feb. 13, 1932   2 Sheets-Sheet 1
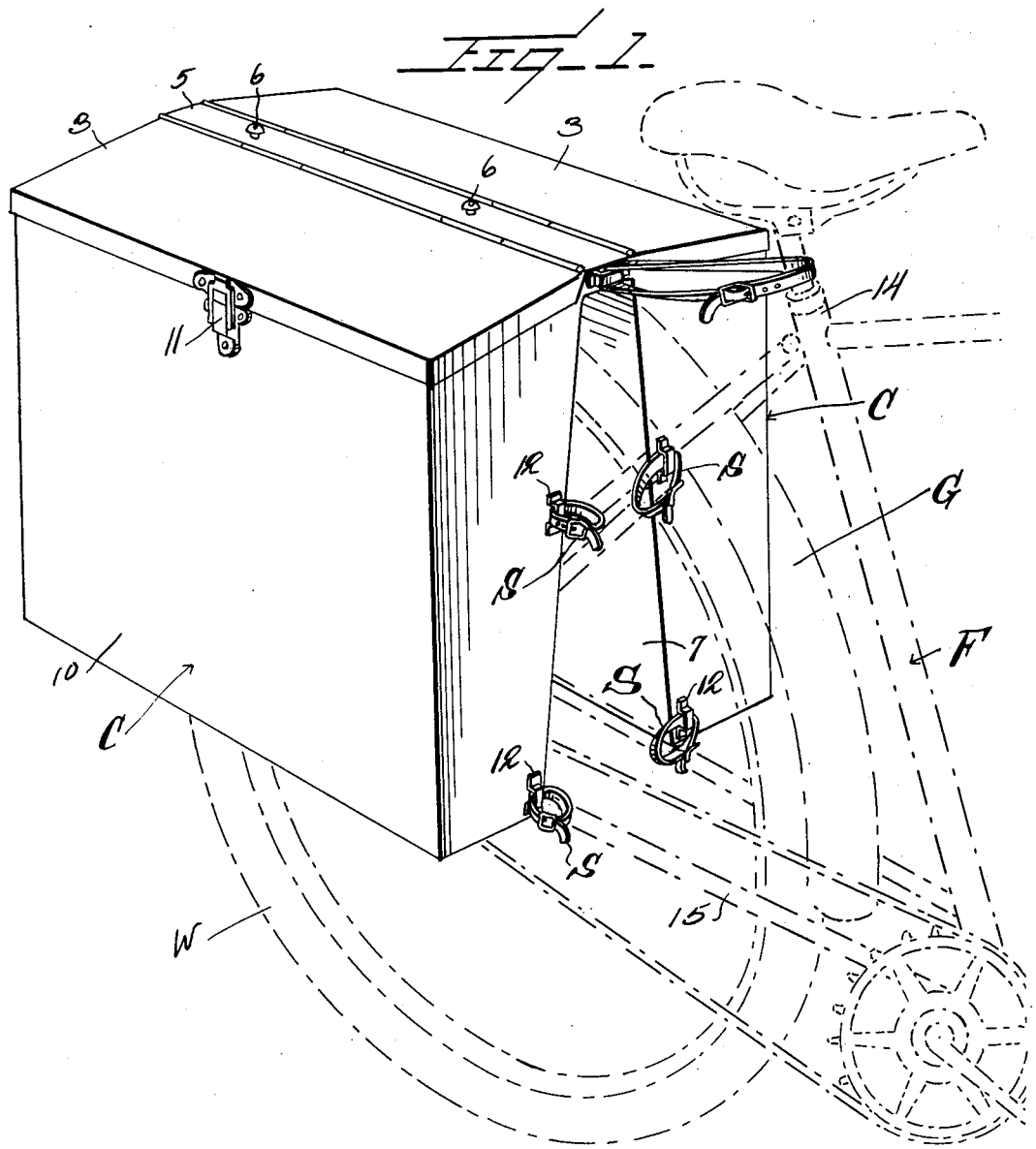
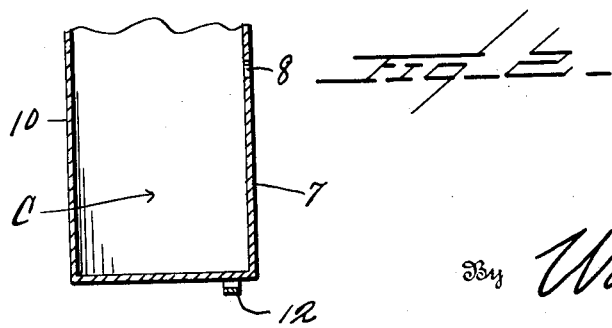
Inventor
C. A. Morales
By Watson E. Coleman
Attorney June 19, 1934.                C. A. MORALES                1,963,333
                                 CARRIER
                           Filed Feb. 13, 1932           2 Sheets-Sheet 2
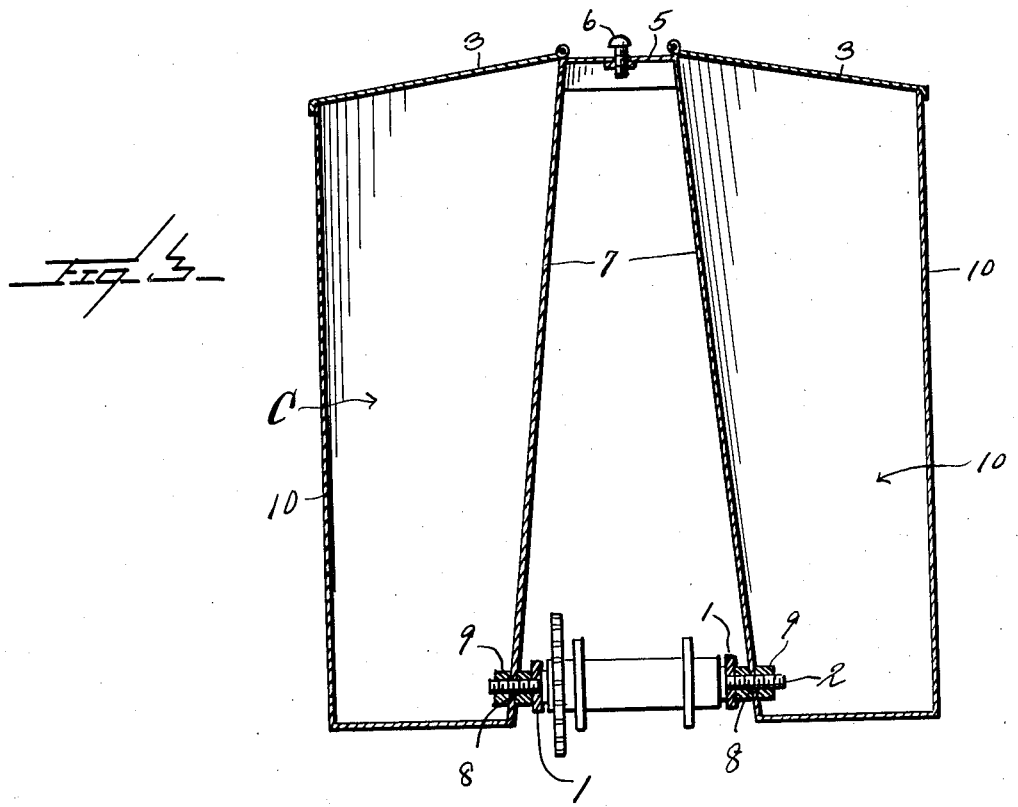
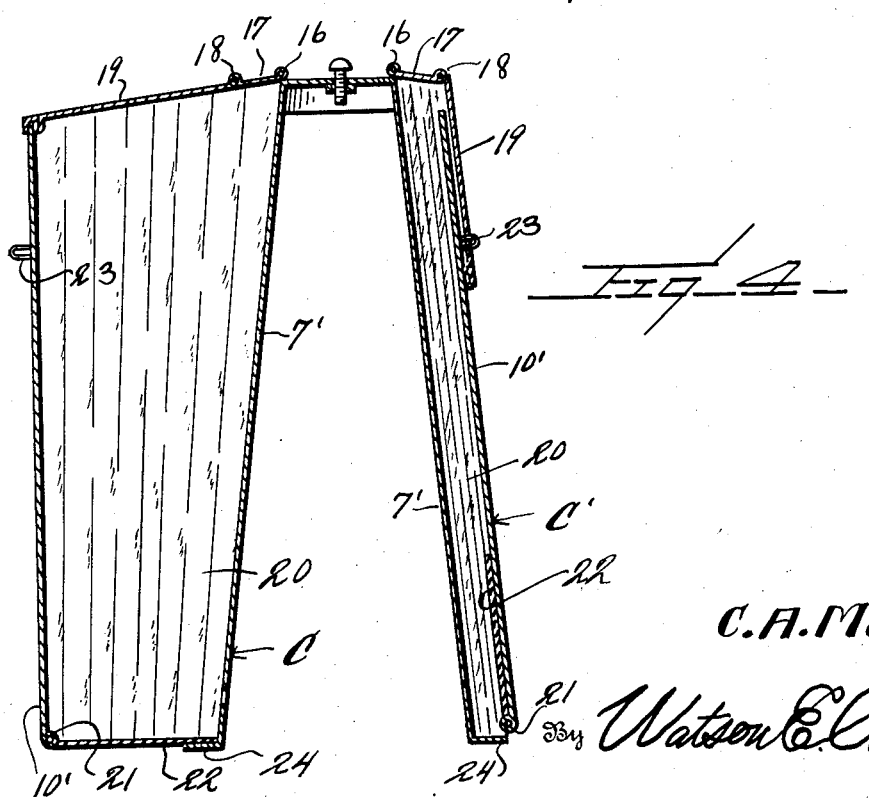

Patented June 19, 1934

1,963,333

UNITED STATES PATENT OFFICE 1,963,333

CARRIER

Caleb A. Morales, Tuckahoe, N. Y., assignor to Mormye, Inc., New York, N. Y., a corporation Application February 13, 1932, Serial No. 592,746

1 Claim. (Cl. 224—32)

This invention relates to carriers and has relation more particularly to a device of this kind especially designed and adapted for use in connection with a bicycle of either a pedal or motor type, and it is primarily an object of the invention to provide a device of this character of a cupboard type whereby the carrier may be employed to advantage in the delivery of newspapers, magazines or other articles which should be effectively protected against the elements or to be safeguarded against pilfer.

Another object of the invention is to provide a device of this kind which in its construction provides a surface or surfaces of sufficient dimensions to permit the same to be effectively employed as an advertising medium.

A further object of the invention is to provide a device of this kind which is constructed in a manner whereby it is effectively supported by the rear wheel of the vehicle and which is also of a character to straddle the rear wheel of the vehicle thereby increasing the capacity of the carrier.

Furthermore, the invention has for an object to provide a device of this kind which, in addition to being operatively supported by the rear wheel of the bicycle or the like, is also adapted to be secured to a mud guard for the rear wheel whereby the carrier is further maintained in desired working or applied position.

The invention consists in the details of construction and in the combination and arrangement of the several parts of my improved carrier whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective of a carrier constructed in accordance with an embodiment of my invention and in applied position, the adjacent portions of a bicycle being indicated by broken lines;

Figure 2 is a fragmentary vertical sectional view taken through the lower portion of one of the containers;

Figure 3 is a transverse sectional view taken through the device as illustrated in Figure 1 with portions of the bicycle axle in elevation;

Figure 4 is a transverse sectional view illustrating a device constructed in accordance with another embodiment of my invention, one of the containers being extended and the other collapsed.

As disclosed in the accompanying drawings, F denotes the rear portion of the frame of a bicycle including the fork 1 carrying an axle 2 upon which is mounted in a well known manner the rear or driving wheel for the vehicle. The bicycle may be pedal operated or of a motor type as preferred. As the driving of the vehicle forms no part of the present invention it is not believed necessary that a detailed description and illustration thereof be given other than to state that disposed over the upper portion of the wheel W is a conventional mud guard G.

My improved carrier as herein embodied comprises two containers C of desired dimensions or capacities each having its top or upper face open and which open face is adapted to be closed by a hinged cover 3. These containers C are spaced apart one from the other and have the upper marginal portions of their opposed side faces bridged or connected by an intermediate plate 5. When the carrier is in applied or working position it is adapted to straddle the rear wheel W from above with, when desired, the intermediate or connecting plate 5 contacting from above with the mud guard G and secured thereto by the thumb screws 6 or other suitable fastening elements.

The inner inside wall 7 of each of the containers C in its lower portion and in relatively close proximity to its forward end is provided with an opening 8 through which is adapted to be projected from without an end portion of the axle 2 outwardly of the fork 1. A holding or retaining nut 9 is engaged with said end portion of the axle 2 within the container whereby the container is effectively anchored or held to the axle.

The outer face of the outer wall 10 of each of the containers C provides a relatively large area upon which if desired suitable advertising matter may be placed so that by use of such advertising medium the value of the carrier will be increased.

Each of the covers 3 is adapted to be held in closed position by a latch 11 of any desired type and to further hold the device in applied position I find it of advantage to employ the straps S. These straps S are secured to the loop members 12 suitably positioned upon the containers C exteriorly thereof, said straps S coacting with the seat post 14 and the bottom bar or member 15 of the bicycle frame F or otherwise as may be preferred.

It is believed to be clearly apparent from the accompanying drawings and the foregoing description that the carrier as herein embodied is especially adapted for use in connection with the transportation of such articles which should be protected against the elements and also against pilfer and which, furthermore, should be maintained at all times in a sanitary condition. By this means the value of the carrier is further increased.

It is also of advantage to provide a container for use in connection with a carrier of this kind which may be readily collapsed so that the device may be compacted to occupy a minimum of space when not actually in use. In Figure 4 I have illustrated an embodiment of my invention where such collapsing of a container C' may be obtained.

In this particular form of invention the container C' comprises a substantially rigid inside wall 7' adapted to be attached to the axle of the bicycle in the same manner as has hereinbefore been set forth with respect to the wall 7 of the carrier C as embodied in the first embodiment of my invention as herein comprised.

The upper marginal portion of the wall 7' has hingedly connected thereto, as at 16, a relatively short or minor cover member 17 to the outer longitudinal marginal portion of which is hingedly connected, as at 18, a second or major cover member 19. These cover members 17 and 19 when extended are adapted to fully close the upper open end of the container C' when extended or adjusted into position for use.

The vertical or end marginal portions of the wall 7' have suitably secured thereto the flexible end walls 20, said walls being each of what may be termed a bellows type so that the same can be readily and conveniently extended or retracted as required. The outer marginal portions of these end walls 20 are secured to the opposite end portions of an outer wall 10', the end walls 20 allowing said outer wall 10' to be readily adjusted toward or from the inside wall 7' as desired.

The lower marginal portion of the outside wall 10' has hingedly connected thereto, as at 21, a bottom wall 22 which, when the container C' is in its collapsed or compacted condition, has been swung upwardly to a position closely adjacent to the inside face of the wall 10' so that said bottom wall will offer no material hindrance or obstruction to the desired collapsing or compacting of the container C' in its entirety.

When the container C' is collapsed or compacted the outer or major cover member 19 will drop down or overlie the outer face of the wall 10' and said cover member 19 together with the wall 10' may be provided with suitable means, as at 23, for holding said cover member 19 in its overlapping relation and at the same time maintain the container C' in its collapsed or compacted adjustment. When it is desired to extend the container C' for use, the cover member 19 is raised and the wall 10' moved outwardly away from the wall 7' and the bottom wall 22 swung downwardly into proper contact with the lower marginal portion of the inside or inner wall 7'. The lower marginal portion of this wall 7' is defined by an inwardly disposed flange 24 or its equivalent to provide an effective support for the bottom wall when in its lowered or active position.

When it is desired to collapse or compact the container C' the bottom wall 22 may be readily swung upwardly by pressure from below or otherwise as may best suit the convenience of the user.

From the foregoing description it is thought to be obvious that a carrier constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A carrier to be applied over a wheel of a bicycle and a guard therefor comprising two transversely spaced containers adapted to be arranged at opposite sides of the wheel, the lower portions of the opposed walls of the containers having openings through which is adapted to be projected the end portions of the axle for the wheel, an intermediate plate connected to and bridging the space between the upper marginal portions of said opposed walls of the containers, and members threaded through said intermediate plate at spaced points therealong for connecting said plate to the mud guard for the wheel.

CALEB A. MORALES.